Sept. 29, 1959   M. B. McGUIRE   2,906,410
SURGICAL INSTRUMENT STORAGE RACK
Filed Oct. 3, 1957
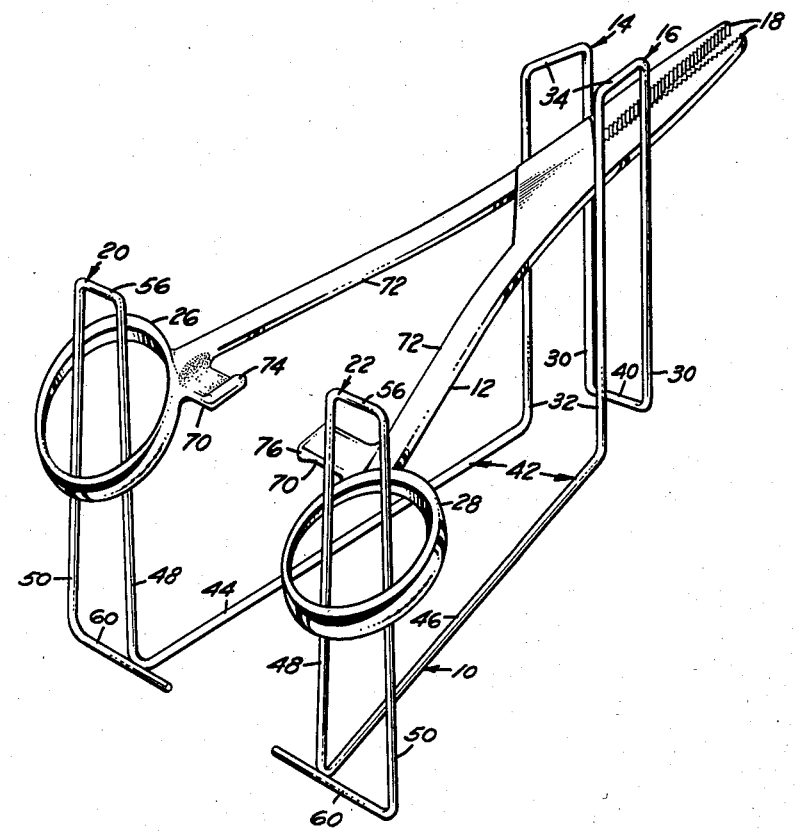
INVENTOR.
Marvin B. McGuire
BY

United States Patent Office

2,906,410
Patented Sept. 29, 1959

2,906,410

SURGICAL INSTRUMENT STORAGE RACK

Marvin B. McGuire, Omaha, Nebr.

Application October 3, 1957, Serial No. 688,057

1 Claim. (Cl. 211—59)

This invention relates to surgical instrument storage and sterilizing and more particularly, it is an object of this invention to provide a novel self-supporting rack to hold hemostats or other scissor-type instruments in an orderly manner.

A further object is to hold such instruments in a manner whereby they are easily prepared for sterilization and easily handled during sterilization and convenient and accessible during an operation.

Heretofore, instruments of this type have been prepared for sterilization by bundling several and fastening them with rubber bands. After sterilization, the rubber bands are removed and the instruments are arranged on the instrument tray to the preference of the surgical nurse. The difficulties and inconvenience in removing the rubber bands and handling the steam-heated metal are overcome by the use of my invention.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

The drawing shows a perspective view of the surgical instrument rack of this invention showing a scissor-type surgical instrument thereon.

Referring to the drawing the rack of this invention is there shown at 10 receiving thereon a scissor-type surgical instrument 12. It is understood that many surgical instruments of this type can be placed on the rack one above the other.

The rack 10 comprises two forward upwardly extending portions, generally indicated at 14 and 16, which are spaced apart sufficiently to receive the jaws 18 of the instrument 12 therethrough at times when the jaws are in substantially a closed position.

The rack generally further comprises two rearward upwardly extending portions 20 and 22 spaced apart a greater distance than the forward upwardly extending portions 14 and 16, the rearward upwardly extending portions 20 and 22 being adapted to receive thereon the finger-receiving portions 26 and 28 of the surgical instrument 12.

More specifically, the forward upwardly extending portions 14 and 16 are each of approximately a U-shape, as seen in side elevation, each having upwardly extending forward and rearward spaced apart sections 30 and 32 respectively interconnecting sections 34. The forward upright sections 30 of the forward upright portions 14 and 16 are connected together at their lower ends by a connecting portion or cross bar 40.

The rack further has a base, generally indicated at 42, and comprising two forwardly and rearwardly extending sections or base bars 44 and 46 connected at forward ends to the lower ends of the rearward upright sections 32 of the forward upright portions 14 and 16.

The sections 44 and 46 of the base 42 have lowermost under surfaces lying in a single plane for holding the rack upright on a flat surface, and the connecting portion 40 has an under surface lying in the same plane.

The rearward upright sections 20 and 22 each comprises an inner leg 48 and an outer upright portion or leg 50 connected together at their upper ends by transverse connecting portions 56.

The inner upright sections 48 of each rearward upright portion 20 and 22 are connected to the rearward end of the respective sections 44 and 46 of the bae 42. The rack further has two stabilizing portions or ends 60 each attached at its outer end to the lower end of the outer upright section of a respective rearward upright portion 20 and 22 and extending inwardly therefrom transversely to the sections 44 and 46 of the base 42 and preferably having lowermost surfaces lying in the same plane as the sections 44 and 46 of the base 42.

In operation the instruments are stacked on a rack one above another. They are then ready for storage or to be placed in a sterilizer during which operations they can be readily handled on the rack.

Upon removal from the sterilizer it may be desired to close the instrument and this may be easily accomplished by forcing the rearward upright portions on toward each other which can be done because the material of the rack is made of preferably resilient material. It is also preferable that all parts of the rack be of a single integral piece of material.

However it can be seen that the most important part to be resilient is the sections 44 and 46 of the base 42.

Such forcing together of the rearward upright portions or guides 20 and 22 makes it possible to unlock the lock members 70 which protrude inwardly from shanks 72 of such instruments, the locks 70 normally having one upwardly extending protrusion 74 and the other downwardly extending protrusion 76 which lock together when desired.

It is because of the lock member 70 on such instruments that the rack is held in a compact position when the locks are closed and one or more instruments are on the rack.

From the foregoing description, it is thought to be obvious that a surgical instrument storage rack constructed in accordance with my invention is particularly well adapted for use, by reason of the convenience and facility with which it may be assemled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In an instrument rack, the combination which comprises a pair of base bars positioned in converging relatiton, each bar extending to the lower end of an inverted U-shaped loop at a narrow, forward end of the rack and the lower ends of the far sides of the loops being connected by a cross bar which is in the same plane as that in which the base bars are positioned, the ends of the base bars at the wide, rear end of the rack being each extended from lower ends of inner legs of inverted U-shaped loops positioned in a plane perpendicular the base bars, the outer legs of the inverted U-shaped loops having lower end portions extended inwardly across the intersections of the inner legs with the base bars to points spaced inwardly from said points of intersection of the inner legs with the base bars, the inner leg of each inverted U-shaped loops at the rear, wide end of the rack being positioned in converging vertical planes in which the base bars and both legs of the loops at the narrow, forward end of the rack are positioned.

References Cited in the file of this patent

UNITED STATES PATENTS

| | | |
|---|---|---|
| 1,150,109 | Flanders | Aug. 17, 1915 |
| 1,380,434 | Dalton | June 7, 1921 |
| 2,461,374 | Custer | Feb. 8, 1949 |